United States Patent
Mills et al.

(10) Patent No.: US 8,680,219 B2
(45) Date of Patent: *Mar. 25, 2014

(54) SYSTEM AND METHOD FOR PROCESSING REACTOR POLYMERIZATION EFFLUENT

(71) Applicant: Chevron Phillips Chemical Company LP, The Woodlands, TX (US)

(72) Inventors: Andrew J. Mills, Houston, TX (US); Ralph W. Romig, Kingwood, TX (US); Ji Xian X. Loh, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,284

(22) Filed: Jun. 21, 2013

(65) Prior Publication Data

US 2013/0280137 A1 Oct. 24, 2013

Related U.S. Application Data

(63) Continuation of application No. 13/710,912, filed on Dec. 11, 2012, now Pat. No. 8,492,492, which is a continuation of application No. 13/085,212, filed on Apr. 12, 2011, now Pat. No. 8,362,161.

(51) Int. Cl.
*C08F 2/00* (2006.01)
*C08F 210/00* (2006.01)
*C08F 110/02* (2006.01)

(52) U.S. Cl.
USPC .............................. 526/89; 526/348; 526/352

(58) Field of Classification Search
USPC ........................................ 526/89, 348, 352
See application file for complete search history.

(56) References Cited

U.S. PATENT DOCUMENTS 3,152,872 A 10/1964 Scoggin et al.
3,248,179 A 4/1966 Norwood
(Continued)

FOREIGN PATENT DOCUMENTS

| EP | 2083020 A1 | 7/2009 |
| WO | 9945035 A1 | 9/1999 |
| WO | 2012141974 A1 | 10/2012 |

OTHER PUBLICATIONS

Filing receipt and specification for patent application entitled "System and method for processing reactor polymerization effluent," by Andrew J. Mills, et al., filed Jun. 21, 2013 as U.S. Appl. No. 13/924,298.

(Continued)

*Primary Examiner* — William Cheung
(74) *Attorney, Agent, or Firm* — Conley Rose, P.C.; Rodney B. Carroll; Chad E. Walter (57) ABSTRACT

A method of treating a polymerization reactor effluent stream comprising recovering the reactor effluent stream from the polymerization reactor, flashing the reactor effluent stream to form a flash gas stream, separating the flash gas stream into a first top stream, a first bottom stream, and a side stream, wherein the side stream substantially comprises hexane, separating the first top stream into a second top stream and a second bottom stream, wherein the second bottom stream substantially comprises isobutane, and separating the second top stream into a third top stream and a third bottom stream; wherein the third top stream substantially comprises ethylene, and wherein the third bottom stream is substantially free of olefins.

20 Claims, 3 Drawing Sheets

(56) References Cited

U.S. PATENT DOCUMENTS

| | | | |
|---|---|---|---|
| 4,501,885 A | 2/1985 | Sherk et al. | |
| 4,588,790 A | 5/1986 | Jenkins, III et al. | |
| 4,589,957 A | 5/1986 | Sherk et al. | |
| 4,885,063 A | 12/1989 | Andre | |
| 5,183,866 A | 2/1993 | Hottovy | |
| 5,207,929 A | 5/1993 | Sung et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,045,661 A * | 4/2000 | Kreischer et al. | 203/73 |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,163,906 B2 | 1/2007 | McDaniel et al. | |
| 7,524,904 B2 | 4/2009 | Verser et al. | |
| 7,619,047 B2 | 11/2009 | Yang et al. | |
| 7,629,421 B2 | 12/2009 | Tait et al. | |
| 7,790,820 B2 | 9/2010 | Jensen et al. | |
| 7,960,487 B2 | 6/2011 | Yang et al. | |
| 8,362,161 B2 * | 1/2013 | Mills et al. | 526/89 |
| 8,492,492 B2 * | 7/2013 | Mills et al. | 526/89 |
| 2009/0004417 A1 | 1/2009 | Follestad et al. | |

OTHER PUBLICATIONS

Foreign communication from a related counterpart application—International Search Report, PCT/US2012/032360 dated Jun. 18, 2012, 3 pages.

Office Action dated Jul. 31, 2013 (11 pages), U.S. Appl. No. 13/924,298, filed Jun. 21, 2013.

* cited by examiner

SYSTEM AND METHOD FOR PROCESSING REACTOR POLYMERIZATION EFFLUENT

CROSS-REFERENCE TO RELATED APPLICATIONS

This application is a continuation of U.S. application Ser. No. 13/710,912 by Andrew J. Mills, et al., entitled "System and Method for Processing Reactor Polymerization Effluent," filed Dec. 11, 2012, Now U.S. Pat. No. 8,492,492 which is a continuation of U.S. application Ser. No. 13/085,212 by Andrew J. Mills, et al., now U.S. Pat. No. 8,362,161 B2, and entitled "System and Method for Processing Reactor Polymerization Effluent," each of which is incorporated herein by reference in its entirety, for all purposes.

FIELD OF THE INVENTION

This disclosure generally relates to a system for processing an effluent stream from a polymerization reaction process. Particularly, the disclosure relates to removing one or more undesired components and recycling one or more reusable components from a polymerization reaction effluent stream.

BACKGROUND OF THE INVENTION

The production of polymers such as polyethylene requires a high purity feedstock of various components, including monomers and co-monomers. In order to offset some of the costs and maximize production, it can be useful to reclaim and/or recycle some feedstock components from an effluent stream resulting from the polymerization reaction. To accomplish this, the reclaimed effluent streams have conventionally either been routed through a purification process or redirected through other redundant processing steps.

Conventional attempts to industrially produce high purity feedstock components has required the operation of numerous distillation columns, compressors (e.g., to achieve the high pressures needed in such conventional processes), refrigeration units (e.g., to achieve cryogenic temperatures) and various other equipment. As such, the equipment and energy costs associated with feedstock purification represent a significant proportion of the total cost for the production of such polymers. Further, the infrastructure required for producing, maintaining, and recycling high purity feedstock represents a significant portion of the associated cost.

Further, such conventional attempts to recover feedstock components have not enabled sufficient control parameters to prevent and/or control deleterious plant conditions. The drawbacks of these designs can lead to process delays, increased costs, and/or other inefficiencies. As such, an improved separation system for polymerization reaction effluent streams is needed.

SUMMARY OF THE INVENTION

Disclosed herein is a method of treating a polymerization reactor effluent stream comprising recovering the reactor effluent stream from the polymerization reactor, flashing the reactor effluent stream to form a flash gas stream, separating the flash gas stream into a first top stream, a first bottom stream, and a side stream, wherein the side stream substantially comprises hexane, separating the first top stream into a second top stream and a second bottom stream, wherein the second bottom stream substantially comprises isobutane, and separating the second top stream into a third top stream and a third bottom stream; wherein the third top stream substantially comprises ethylene, and wherein the third bottom stream is substantially free of olefins.

Also disclosed herein is a method of treating a polymerization reactor effluent stream comprising recovering the effluent stream from the polymerization reactor, flashing the effluent stream to form a flash gas stream, feeding the flash gas stream into a first column, recovering a first overhead stream, a first bottom stream, and a side stream, from the first column, wherein the side stream substantially comprises hexane, feeding the first overhead stream into an accumulator vessel, recovering a second overhead stream and a second bottom stream from the accumulator vessel, wherein the second bottom stream substantially comprises isobutane, feeding the second overhead stream to a second column, and recovering a third overhead stream and a third bottom stream from the second column, wherein the third bottom stream is substantially olefin-free.

DETAILED DESCRIPTION OF EMBODIMENTS

Disclosed herein are various embodiments of systems, apparatuses, and methods related to polymerization reactions, particularly, polyethylene polymerization. The systems, apparatuses, and methods are generally related to a process for the separation and handling of the effluent stream from a polyethylene polymerization process.

Figure 1:
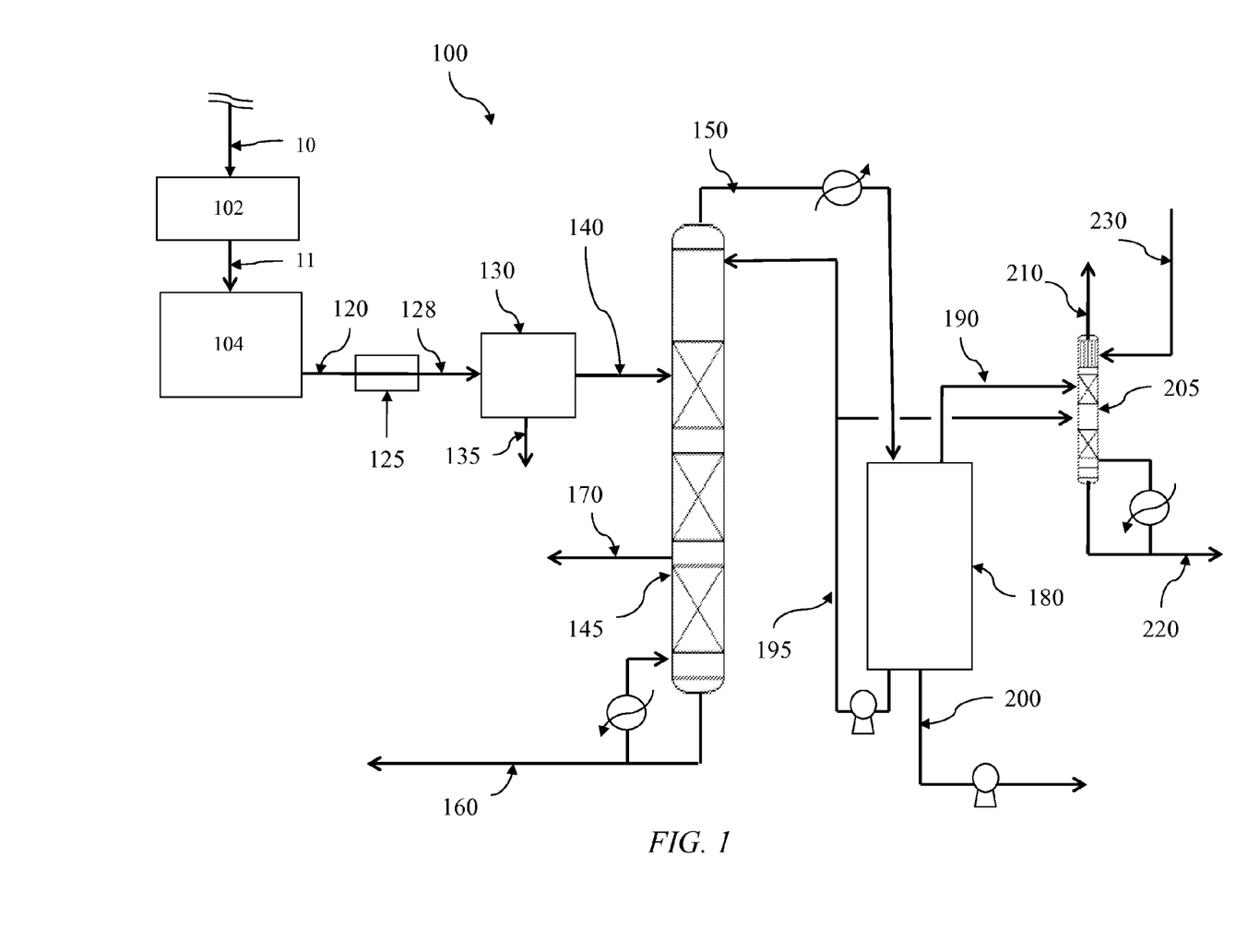
FIG. 1 is a block diagram of a polyethylene polymerization system, according to an embodiment of the disclosure.

Referring to FIG. 1, a first polyethylene production (PEP) system 100 is disclosed. PEP system 100 generally comprises a purifier 102, reactor 104, a flash-line heater 125, a flash chamber 130, a first column 145, an accumulator 180, and a second column 205. In the embodiments disclosed herein, various such system components may be in fluid communication via one or more conduits (e.g., pipes, tubing, flow lines, etc.) suitable for the conveyance of a particular stream, for example as shown in FIG. 1 by the streams which are conveyed via such conduits. In alternative embodiments, the same or similar equipment and/or processes may be employed for the production of other polymeric materials, for example polypropylene, polybutylene, polyvinylchloride, or the like.

Figure 2:
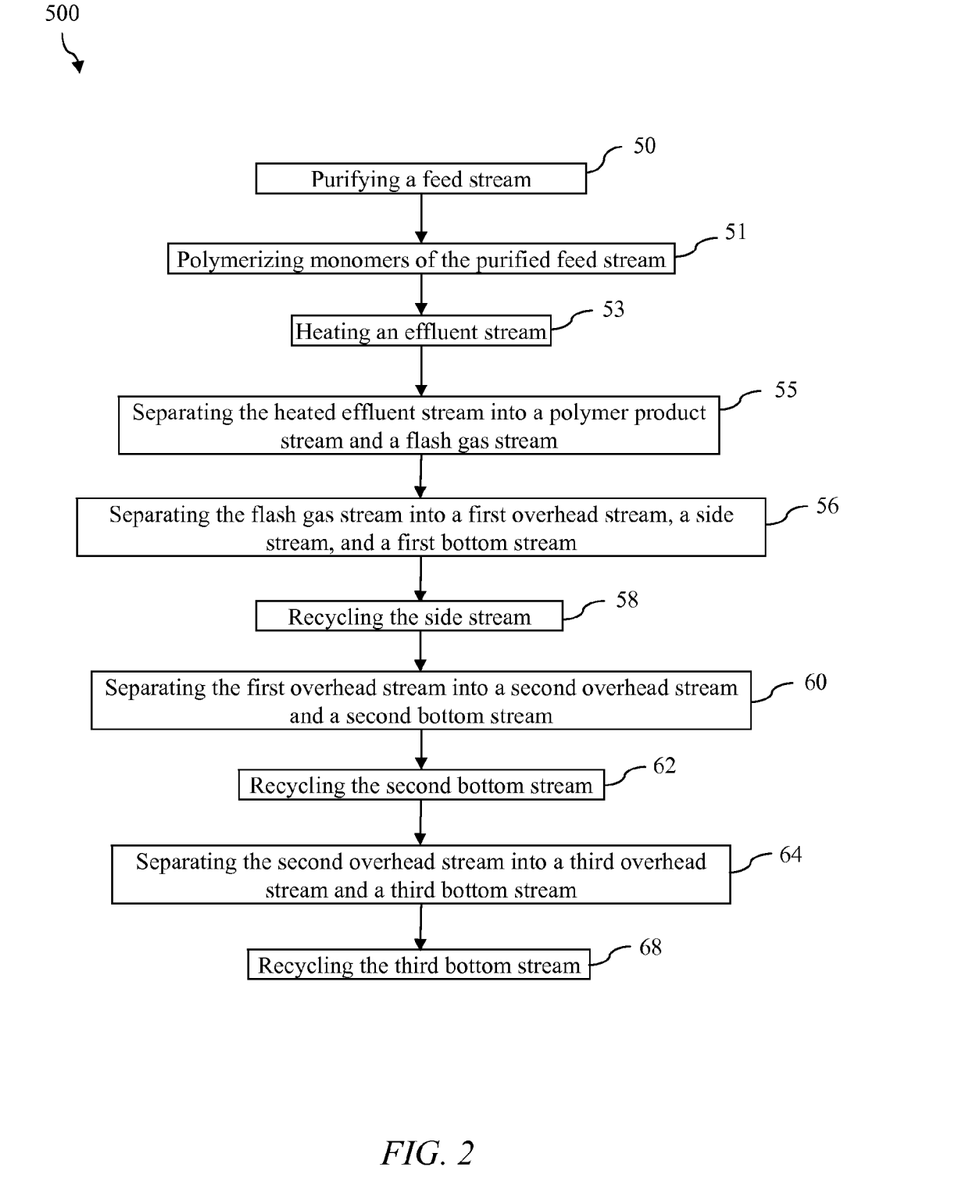
FIG. 2 is a flow diagram of a polyethylene production process, according to an embodiment of the disclosure.

Referring to FIG. 2, a first PEP process 500 is illustrated. PEP process 500 generally comprises at block 50 purifying a feed stream, at block 51 polymerizing monomers of the purified feed stream in one or more reactors, at block 53 heating an effluent stream from the one or more reactors, at block 55 separating the heated effluent stream into a polymer product stream and a flash gas stream, at block 56 separating the flash gas stream into a first overhead stream, a side stream, and a first bottom stream, at block 58 recycling the side stream to the one or more reactors, at block 60 separating the first overhead stream into a second overhead stream and a second bottom stream, at block 62 recycling the second bottom stream to the one or more reactors, at block 64 separating the second overhead stream into a third overhead stream and a third bottom stream, and at block 68 recycling the third bottom stream to the one or more reactors.

In an embodiment, the PEP process 500 or a portion thereof, may be implemented via a PEP system like PEP system 100 illustrated in FIG. 1. In the embodiment of FIG. 1, purifying the feed stream 10 in purifier 102 may yield a purified stream 11 comprising substantially pure monomers (e.g., ethylene monomers), as will be described herein. Polymerizing monomers of the purified stream 11 in the reactor 104 may yield an effluent stream 120 generally comprising unreacted ethylene, ethane, diluent (e.g., one or more of propane, propylene, isobutane, n-butane, etc. . . . ), and a polymerization product (e.g., polyethylene). Heating the effluent stream 120 in heater 125 may yield a heated effluent stream 128. Separating the heated effluent stream 128 in flash chamber 130 may yield a polymer product stream 135 and a flash gas stream 140. Separating the flash gas stream 140 in first column 145 may yield a first overhead stream 150 generally comprising $C_4$ and smaller/lighter hydrocarbons, a first bottom stream 160 generally comprising $C_6$ and larger/heavier hydrocarbons, and a side stream 170 generally comprising hexene. Separating the first overhead stream 150 in accumulator 180 may yield a second top stream 190 generally comprising isobutane, ethylene, ethane, and/or other light hydrocarbons, and a second bottom stream 200 generally comprising isobutane, ethylene, and/or other hydrocarbons. In an embodiment as will be discussed herein the concentration of light hydrocarbons (e.g., ethylene and ethane) may be less in the second top stream 190 than in the second bottom stream 200. Separating the second top stream 190 in second column 205 may yield a third overhead stream 210 comprising substantially ethylene, and a third bottom stream 220 generally comprising olefin-free isobutane.

Various embodiments of suitable PEP systems having been disclosed, embodiments of a PEP process are now disclosed. One or more of the embodiments of a PEP process may be described with reference to PEP system 100. Although a given PEP process may be described with reference to one or more embodiments of a PEP system, such a disclosure should not be construed as so-limiting. Although the various steps of the processes disclosed herein may be disclosed or illustrated in a particular order, such should not be construed as limiting the performance of these processes to any particular order unless otherwise indicated.

In an embodiment, a feed stream is purified (e.g. at block 50). Purifying the feed stream may comprise separating unwanted compounds and elements from a feed stream comprising ethylene to form a purified feed stream. In embodiments illustrated by FIG. 1, purifying the feed stream may comprise routing the feed stream 10 to the purifier 102. In one or more of the embodiments disclosed herein, the purifier 102 may comprise a device or apparatus suitable for the purification of one or more reactant gases in a feed stream which may comprise a plurality of potentially unwanted gaseous compounds, elements, contaminants, or the like. Non-limiting examples of a suitable purifier 102 may comprise a filter, a membrane, a reactor, an absorbent, a molecular sieve, one or more distillation columns, fractionation columns, or combinations thereof. The purifier 102 may be configured to separate ethylene from a stream comprising methane, ethane, acetylene, propane, propylene, water, oxygen, other gaseous hydrocarbons, various contaminants, and/or combinations thereof.

In an embodiment, purifying a feed stream may yield a purified feed stream 11 comprising substantially pure ethylene. In an embodiment, the purified feed stream may comprise less than 25% by weight, alternatively, less than about 10%, alternatively, less than about 1.0% of any one or more of nitrogen, oxygen, methane, ethane, propane, other hydrocarbons, or combinations thereof. As used herein "substantially pure ethylene" refers to a fluid stream comprising at least about 60% ethylene, alternatively, at least about 70% ethylene, alternatively, at least about 80% ethylene, alternatively, at least about 90% ethylene, alternatively, at least about 95% ethylene, alternatively, at least about 99% ethylene by weight, alternatively, at least about 99.5% ethylene by weight. In an embodiment, the purified feed stream 11 may further comprise trace amounts of ethane.

In an embodiment, monomers of the purified feed stream 11 may be polymerized (e.g., at block 51). Polymerizing monomers of the purified feed stream 11 may comprise allowing a polymerization reaction between a plurality of monomers by contacting a monomer or monomers with a catalyst system under conditions suitable for the formation of a polymer. A suitable catalyst system may comprise a catalyst and, optionally, a co-catalyst and/or promoter. Non-limiting examples of suitable catalyst systems include Ziegler-Natta catalysts, Ziegler catalysts, chromium catalysts, chromium oxide catalysts, chromocene catalysts, metallocene catalysts, nickel catalysts, or combinations thereof. Catalyst systems suitable for use in this disclosure have been described, for example, in U.S. Pat. No. 7,619,047 and U.S. Patent Application Publication Nos. 2007/0197374, 2009/0004417, 2010/0029872, 2006/0094590, and 2010/0041842, each of which is incorporated by reference herein in its entirety. In an embodiment, any suitable catalyst system may be employed, as may be appropriate for a given process or product need or desire.

In the embodiment illustrated in FIG. 1, polymerizing monomers of the purified feed may comprise routing the purified feed stream 11 to the polymerization reactor 104. In one or more of the embodiments disclosed herein, the reactor 104 may comprise any vessel or combination of vessels suitably configured to provide an environment for a chemical reaction (e.g., a contact zone) between monomers (e.g., ethylene) and/or polymers (e.g., an active or growing polymer chain) in the presence of a catalyst to yield a polymer (e.g., a polyethylene polymer). Although the embodiment of FIG. 1 illustrates a PEP system having one reactor, one of skill in the art viewing this disclosure will recognize that two or more reactors arranged in any suitable configuration (e.g., in series and/or in parallel) may be employed.

As used herein, the terms "polymerization reactor" or "reactor" include any polymerization reactor (e.g., a vessel) capable of polymerizing olefin monomers to produce homopolymers or copolymers. Such homopolymers and copolymers may be referred to as resins or polymers. The various types of reactors include those that may be referred to as batch, slurry, gas-phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch and/or continuous processes. Continuous processes may use intermittent or continuous product discharge. Processes may also include partial or full direct recycle of un-reacted monomer, un-reacted comonomer, and/or diluent.

Polymerization reactor systems of the present disclosure may comprise one type of reactor in a system. Alternatively, in an embodiment where multiple reactors are employed, two or more reactors of the same or different type. Production of polymers in multiple reactors may include several stages in at least two separate polymerization reactors interconnected by a transfer device or conduit making it possible to transfer the polymers resulting from the first polymerization reactor into the second reactor. The desired polymerization conditions in one of the reactors may be different from the operating conditions of the other reactors. Alternatively, polymerization in multiple reactors may include the transfer of polymer from a first reactor to a subsequent reactor(s) for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel, or any combination thereof.

According to one aspect of this disclosure, the polymerization reactor may comprise at least one gas phase reactor. In an alternative aspect, the polymerization reactor may comprise at least one gas phase reactor in combination with at least one other reactor, which may be a slurry loop reactor or a solution polymerization reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to another aspect of the disclosure, the polymerization reactor system may additionally comprise at least one loop slurry reactor comprising vertical or horizontal loops. Monomer, diluent, catalyst, and optionally any comonomer may be continuously fed to a loop reactor where polymerization may occur. Generally, continuous processes may comprise the continuous introduction of a monomer, a catalyst, and a diluent into a polymerization reactor and the continuous removal from this reactor of a suspension comprising polymer particles and the diluent. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example of polymerization of propylene monomer is disclosed in U.S. Pat. No. 5,455,314, which is incorporated by reference herein in its entirety. A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein. In an embodiment, any suitable type, form, style, or combination of polymerization reactor or reactors may be employed in a given application.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone may be maintained at temperatures and pressures that result in the formation of a solution of the polymer in a reaction medium. Agitation may be employed to obtain better temperature control and to maintain uniform polymerization mixtures throughout the polymerization zone. Adequate means may be utilized for dissipating the heat of polymerization.

Polymerization reactors suitable for the present disclosure may further comprise any combination of at least one raw material feed system, at least one feed system for catalyst or catalyst components, at least one recycle system, and/or at least one polymer recovery system. Suitable reactor systems for the present disclosure may further comprise systems for feedstock purification, catalyst storage and preparation, extrusion, reactor cooling, polymer recovery, fractionation, recycle, storage, load-out, laboratory analysis, process control, and/or other systems.

Conditions that may be controlled for polymerization efficiency and to provide desired resin properties include time, temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reaction.

Suitable contact time of the components of the polymerization process may vary, as may be appropriate for a given process or product need or desire. In addition to contact time for the polymerization reaction itself, any/all times for pre-contacting, pre-activation, activation, aging, conditioning, or other process relating to the polymerization step may be varied, as may be necessary or desired to achieve an appropriate outcome.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages. In an embodiment, polymerization may occur in an environment having a suitable combination of temperature and pressure. For example, polymerization may occur at a pressure in a range from about 425 psi to about 900 psi, alternatively, about 450 psi to about 675 psi, and a temperature in a range from about 60° C. to about 280° C., alternatively, from about 70° C. to about 110° C.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations and/or partial pressures of monomer, co-monomer, hydrogen, co-catalyst, modifiers, and electron donors are important in producing these resin properties.

Comonomer may be used to control product density. Hydrogen may be used to control product molecular weight. Co-catalysts can be used to alkylate, scavenge poisons and control molecular weight. Modifiers can be used to control product properties and electron donors affect stereoregularity, the molecular weight distribution, or molecular weight. In addition, the concentration of poisons is minimized because poisons impact the reactions and product properties.

In an embodiment, polymerizing monomers of the purified feed may comprise introducing a suitable catalyst system into the reactor 104, so as to form a slurry. Alternatively, a suitable catalyst system may reside in the reactor 104.

As explained above, polymerizing monomers of the purified feed may comprise selectively manipulating one or more polymerization reaction conditions to yield a given polymer product, to yield a polymer product having one or more desirable properties, to achieve a desired efficiency, to achieve a desired yield, the like, or combinations thereof. Non-limiting examples of such parameters include time, temperature, pressure, type and/or quantity of catalyst or co-catalyst, the concentrations and/or partial pressures of various reactants, or other process parameters. In an embodiment, polymerizing monomers of the purified feed 11 may comprise adjusting one or more polymerization reaction conditions.

In an embodiment, polymerizing monomers of the purified feed may comprise maintaining a suitable temperature, pressure, and/or partial pressure(s) during the polymerization reaction, alternatively, cycling between a series of suitable temperatures, pressures, and/or partials pressure(s) during the polymerization reaction.

In an embodiment, polymerizing monomers of the purified feed may comprise circulating, flowing, cycling, mixing, agitating, or combinations thereof, the monomers, catalyst system, and/or the slurry within the reactor 104. In an embodiment where the monomers, catalyst system, and/or slurry are circulated, circulation may be at a velocity (e.g., fluid velocity) of from about 1 m/s to about 30 m/s, alternatively, from about 2 m/s to about 17 m/s, alternatively, from about 3 m/s to about 15 m/s.

In an embodiment, polymerizing monomers of the purified feed may comprise configuring the reactor 104 to yield a multimodal (e.g., a bimodal) polymer (e.g., polyethylene). For example, the resultant polymer may comprise both a relatively high molecular weight, low density (HMWLD) polyethylene polymer and a relatively low molecular weight, high density (LMWHD) polyethylene polymer. For example, various types of suitable polymers may be characterized as having a various densities. For example, a Type I may be characterized as having a density in a range of from about 0.910 g/cm3 to about 0.925 g/cm3, alternatively, a Type II may be characterized as having a density from about 0.926 g/cm3 to about 0.940 g/cm3, alternatively, a Type III may be characterized as having a density from about 0.941 g/cm3 to about 0.959 g/cm3, alternatively, a Type IV may be characterized as having a density of greater than about 0.960 g/cm3.

In the embodiment illustrated in FIG. 2, polymerizing monomers of the purified feed in reactor 104 may yield an effluent stream 120, which may generally comprise various solids, semi-solids, volatile and nonvolatile liquids, gases and/or combinations thereof. For example, the effluent stream 120 may comprise unreacted reactant monomers (e.g., unreacted ethylene monomers) liquids, diluents, waste products, other gases, and/or contaminants. In an embodiment, the effluent stream 120 may comprise hydrogen, nitrogen, methane, ethylene, ethane, propylene, propane, butane, isobutane, pentane, hexane, hexene-1 and heavier hydrocarbons and polymer product (e.g., polyethylene). In an embodiment, ethylene may be present in a range of from about 0.1% to about 15%, alternatively, from about 1.0% to about 10%, by weight. Ethane may be present in a range of from about 0.001% to about 4%, alternatively, from about 0.2% to about 2% by weight. Isobutane may be present in a range from about 70% to about 99%, alternatively, from about 80% to about 98%, alternatively, about 83% to about 97% by weight. The solids and/or liquids may comprise a polymer product (e.g., a polyethylene polymer), often referred to at this stage of the PEP process 100 as "polymer fluff", or simply "fluff."

In an embodiment, heat may be added to effluent stream 120 (e.g. at block 53). For example, energy (e.g. heat) may be added to effluent stream 120 to facilitate processing (separation of the components of effluent stream 120, as will be discussed herein). In an embodiment, heating the effluent stream may be accomplished by any suitable device, apparatus, or process as will yield component states and/or phases, increases in effluent stream temperature, or combinations thereof as may be desired for a given application. In the embodiment of FIG. 1, heating the effluent stream 120 may comprise routing the effluent stream 120 through a suitable heater, for example, flash-line heater 125. As used herein, the term "flash-line heater" may refer to a device or apparatus configured and arranged to add heat to a stream (e.g., effluent stream 120, which may comprise solids, liquids, and/or gases). Suitable flash-line heaters as may be employed herein are disclosed in U.S. Pat. Nos. 3,152,872; 5,183,866; and 5,207,929, each of which is incorporated herein in its entirety. An example of a suitable flash-line heater is a heat exchanger. Such a heat exchanger may comprise a double-walled pipe in which the substance to be heated (e.g., effluent stream 120) flows through an inner pipe while steam is injected in an outer or surrounding pipe. In an embodiment, the flash-line heater may operate intermittently. Generally, the volume of material flowing through a heat exchanger and the speed at which it flows determine the amount of heat that will be added. In an embodiment, heating the effluent stream 120 may yield a heated effluent stream 128.

In an alternative embodiment, heat is not be added to effluent stream 120. For example, in an embodiment, the polymerization reaction may occur at temperatures, pressures, and/or other operating parameters as may provide sufficient energy to make unnecessary the addition of heat or energy to the effluent stream.

In an embodiment, the heated effluent stream 128 (alternatively, in an embodiment where the effluent stream has not been heated, the effluent stream 120) may be separated into a polymer product stream and a flash gas stream (e.g. at block 55). In an embodiment, separating the heated effluent stream 128 into a polymer product stream and a flash gas stream may be by any suitable device, apparatus, or process. For example, in an embodiment, separating an effluent stream (such as heated effluent stream 128 or effluent stream 120) into a polymer product stream and a flash gas stream may comprise flashing the effluent stream. Not intending to be bound by theory, "flashing" a stream generally refers to causing a phase change in which liquid phase components of a stream (e.g., the heated effluent stream 128) are converted into gas phase components (e.g. vaporizing/gasifying the liquid components of the stream), for example, as by a reduction of the pressure of the stream. In an embodiment, flashing may be accomplished by adding heat to a stream (e.g. as described above with respect to Block 53), reducing the pressure of the stream, adding other forms of energy to the stream (e.g. ultrasonic energy), or combinations thereof. For example, flashing a stream may comprise rapidly (e.g., instantaneously or nearly instantaneously) allowing the volume of the stream to increase such that the pressure of the stream falls and the liquid components of the stream enter a vapor or gas phase. As such, a stream that has been flashed may comprise gaseous phase components (e.g., the flash gas) and solid phase components (e.g., the polymer product). For example, in an embodiment substantially all (e.g., at least 98%, alternatively 99%, alternatively 99.5%, alternatively 99.9%) by total weight of the heated effluent stream 128 of non-polymer components (e.g., liquids and gases) present in stream 128 are recovered as gases via stream 140.

In an embodiment, separating an effluent stream (e.g., the heated effluent stream 128) into a polymer product stream and a flash gas stream may generally comprise segregating the gas phase components from the solid phase components. Segregating the gas phase components and the solid phase components may be by any suitable device, apparatus, or process. For example, in an embodiment where a stream has been flashed, the solid phase components (e.g., the polymer product) and the vapor phase components (e.g., the flash gas) may be separated by cyclonic separation. Generally speaking, cyclonic or vortex separation refers to a method of separating solid, and/or particulate materials from gaseous materials, for example, via a high speed rotating flow established within a cylindrical or conical container (e.g., a cyclonic chamber or cyclone). Material flows in a spiral pattern, beginning at the top (wide end) of the cyclone and ending at the bottom (narrow) end before exiting the cyclone. Not intending to be bound by theory, solid and/or particulate material (e.g. the polymer fluff) entrained within a rotating, gaseous stream within the cyclone have too much inertia to follow the tight curve of the rotating, gaseous stream and, thus, strike the outside wall of the cyclone, and fall toward the bottom of the cyclone. In such a conical system, as the rotation flow moves towards the narrow end of the cyclone the rotational radius of the stream is reduced, separating smaller and smaller particles. The cyclone geometry, together with flow rate, defines the "cut point" of the cyclone; that is, the size of particle that will be removed from the stream with 50% efficiency. Generally, particles having a size larger than the cut point will be removed with a greater efficiency, and smaller particles with a lower efficiency.

In an alternative embodiment, the solid phase components may be sufficiently segregated from the gaseous components upon flashing (e.g., vaporization) of the stream and without the need to subject the solid phase components and the gaseous components to any further segregating process. For example, the solid materials that had been entrained within the stream may "fall out" when the liquid components of the stream undergo a phase change to vapor.

In the embodiment of FIG. 1, separating the heated effluent stream comprises routing the heated effluent stream 128 into the flash chamber 130. Flash chamber 130 may comprise a single vessel or multiple vessels, as suitable, and may comprise additional flash compartments or chambers, cyclonic separators, flush/surge chambers, various valves, inlets, outlets, filters (such as bag filters), or other suitable equipment. Not seeking to be bound by theory, as the heated effluent stream 128 is introduced into the flash chamber 130, the volume of the stream entering the flash chamber 130 may expand rapidly, resulting in a decrease in the pressure of the stream and the vaporization of the liquid components of the heated effluent stream 128. As such, in an embodiment, introduction of the heated effluent stream 128 into the flash chamber 140 (e.g., flashing the heated effluent stream 128) may yield solid components (e.g., polymer product or polymer fluff) and gaseous or vaporous components (e.g., flash gases).

Also in the embodiment of FIG. 1, the polymer product may be segregated from the flash gases by cyclonic separation as described above.

In the embodiment of FIG. 1, the solid components of the heated effluent stream 128 may exit the flash chamber 130 as a polymer product stream 135 and the gaseous or vaporous components as flash gas stream 140. In an embodiment, the polymer product stream 135 may comprise polymer fluff comprising oligomers and/or larger polymers, as produced in the polymerization reaction or reactions described previously (e.g., polyethylene). In an embodiment, the flash gas stream 140 may comprise the non-solid components of the effluent stream 120 in the vapor phase (e.g., hydrogen, nitrogen, methane, ethylene, ethane, propylene, propane, butane, isobutane, pentane, hexane, hexene-1 and heavier hydrocarbons).

In an embodiment, the flash gas stream 140 may exit the flash chamber 130 at a suitable pressure. For example, the pressure of flash gas stream 140 as it exits flash chamber 130 may be within a pressure range of from about 14.7 psia to about 527.9 psia, alternatively, from about 15.7 psia to about 348 psia, alternatively, from about 85 psia to about 290 psia.

In an alternative embodiment, separating the heated effluent stream 128 (alternatively, in an embodiment where the effluent stream has not been heated, the effluent stream 120) into a polymer product stream 135 and a gaseous stream (e.g. flash gas stream 140) may be by filtration, membrane separation, various forms of centrifugal separation, or other suitable device, apparatus, or process of separation as will be appreciated by one of ordinary skill in the art with the aid of this disclosure.

In an embodiment, flash gas stream 140 may be separated into a first overhead stream, a side stream, and a first bottom stream (e.g. at block 56). In an embodiment, separating the flash gas stream 140 may generally comprise segregating parts of the flash gas stream 140 on the basis of various differences in physical or chemical properties between those parts. In an embodiment, separating the flash gas stream 140 into a first overhead stream, a side stream, and a first bottom stream may generally comprise separating the flash gas stream 140 into a first overhead stream comprising $C_4$ and lighter hydrocarbons and any other gases (e.g., hydrogen or nitrogen), a first bottom stream comprising $C_6$ and heavier compounds such as alkanes, and a side stream comprising hexene.

In an embodiment, separating the flash gas stream 140 into a first overhead stream, a side stream, and a first bottom stream may occur by any suitable device, apparatus, or process. Nonlimiting examples of such a suitable process include fractionation, distillation, and the like. Not intending to be bound by theory, fractionation refers to a separation process in which a mixture is separated into a number of parts based on differences in a given property of those parts. In an embodiment it may be possible to separate components of a mixture in a single run via fractionation. Not intending to be bound by theory, distillation refers to a separation process in which a mixture is separated based on differences in the volatilities of the components of the mixture. Generally speaking, distillation involves adding heat to a mixture, allowing the various components of the mixture to volatilize into the vapor phase, and then collecting the individual components as they condense at different points within the distillation column.

In the embodiment of FIG. 1, separating the flash gas stream 140 into a first overhead stream, a side stream, and a first bottom stream may comprise routing the flash gas stream to the first column 145. In an embodiment, the first column 145 may comprise a fractionation tower (or fractionation column). In an alternative embodiment, the first column may comprise a distillation column (or distillation tower). In an embodiment, first column 145, may be provided with one or more inlets and at least two outlets. The first column 145 may be operated at a suitable temperature and pressure, for example as may be suitable to achieve separation of the components of the flash gas stream 140. For example, the first column 145 may be operated at a temperature in a range of from about 15° C. to about 233° C., alternatively, from about 20° C. to about 200° C., alternatively, from about 20° C. to about 180° C., and/or a pressure in a range of from about 14.7 psi to about 527.9 psi, alternatively, from about 15.7 psi to about 348 psi, alternatively, from about 85 psi to about 290 psi. The first column 145 may be configured and/or sized provide for separation of a suitable volume of gases (e.g., the flash gas stream). As will be appreciated by one of skill in the art viewing this disclosure, the flash gas stream 140 may remain and/or reside within first column 145 for any suitable amount of time, for example an amount of time as may be necessary to provide sufficient separation of the components of flash gas stream 140.

In an embodiment, the flash gas stream 140 may be introduced into the first column 145 without a compressive step, that is, without compression of the flash gas stream after it is emitted from the flash chamber 130 and before it is introduced into the first column 145. In another embodiment, the flash gas stream 140 may be introduced into the first column 145 at substantially the same pressure as the outlet pressure of flash chamber 130 (e.g., a pressure of from about 14.7 psia to about 527.9 psia, alternatively, from about 15.7 psia to about 348 psia, alternatively, from about 85 psia to about 290 psia at the outlet of the flash chamber 130). In still another embodiment, the flash gas stream 140 may be introduced into the first column 145 without a significant compressive step. In an embodiment, flash gas stream 140 may be introduced into first column at a pressure in a range of from about 25 psi less than the pressure at which the flash gas stream was emitted from the flash chamber to about 25 psi greater than the pressure at which the flash gas stream was emitted from the flash chamber, alternatively, from about 15 psi less than the pressure at which the flash gas stream was emitted from the flash chamber to about 15 psi greater than the pressure at which the flash gas stream was emitted from the flash chamber, alternatively, from about 5 psi less than the pressure at which the flash gas stream was emitted from the flash chamber to about 5 psi greater than the pressure at which the flash gas stream was emitted from the flash chamber. In an embodiment, the flash gas stream 140 may be introduced into the first column at a pressure in a range of from about 14.7 psia to about 527.8 psia, alternatively, from about 15.7 psia to about 348 psia, from about 85 psia to about 290 psia.

In an embodiment, the first column 145 may be configured and/or operated such that each of the first overhead stream 150, the first bottom stream 160, and the side stream 170 may comprise a desired portion, part, or subset of components of the flash gas stream 140. For example, as will be appreciated by one of skill in the art with the aid of this disclosure, the location of a particular stream outlet, the operating parameters of the first column 145, the composition of the flash gas stream 140, or combinations thereof may be manipulated such that a given stream may comprise a particular one or more components of the flash gas stream 140.

In an embodiment, the first overhead stream 150 may be characterized as comprising $C_4$ and lighter hydrocarbons (e.g., butane, isobutane, propane, ethane, or methane) and any light gases e.g., hydrogen or nitrogen). For example, $C_4$ and lighter hydrocarbons and gases may be present in the first overhead stream 150 in an amount of from about 80% to about 100% by total weight of the first overhead stream, alternatively from about 90% to about 99.999999%, alternatively from about 99% to about 99.9999%, alternatively, $C_5$ and heavier hydrocarbons may be present in the first overhead stream in an amount from 0% to about 20% by total weight of the first overhead stream, alternatively from about 10% to about 0.000001%, alternatively from about 1.0% to about 0.0001%. Also, for example, at least 90% by weight of the flash gas stream 140 of the $C_4$ and lighter hydrocarbons and gases may be present in the first overhead stream, alternatively, at least 98%, alternatively, at least 99%.

In an embodiment, the first bottom stream 160 may be characterized as comprising $C_6$ and heavier components such as alkanes, that is, alkanes larger than hexane (e.g., heptane and/or other large alkanes). In an embodiment, hydrocarbons other than $C_6$ and heavier alkanes may be present in the first bottom stream in an amount less than about 15%, alternatively, less than about 10%, alternatively, less than about 5% by total weight of the first bottom stream. In an embodiment, the first bottom stream may be directed to additional processing steps or methods, or alternatively they may be disposed of, as appropriate. In an embodiment, first bottom stream 160 may be directed to a flare for disposal.

In an embodiment, side stream 170 may be characterized as comprising hexene. For example, hexene may be present in side stream 170 in an amount of from about 20% to about 98% by total weight of the side stream, alternatively from about 40% hexene to about 95%, alternatively from about 50% hexene to about 95% hexene.

In an embodiment, at least a portion of the first bottom stream 160 may be returned to the first column 145. For example, in the example of FIG. 1, a portion of the first bottom stream 160 is routed, via a reboiler, to the first column 145 for additional processing.

In an embodiment, the side stream 170 may be recycled (e.g. at block 58). In the embodiment of FIG. 1, recycling the side stream may comprise routing, for example, via a suitable pump or compressor, the side stream 170 back to and/or introducing the side stream 170 into the PEP system 100, for example, for reuse in a polymerization reaction. Recycling the side stream 170 (e.g., comprising hexene) may provide an efficient and/or cost-effective means of supplying hexene for operation of the polymerization reaction process. In an embodiment, the hexene of side stream 170 may be employed in the polymerization reaction as, for example, a comonomer in the reaction. In an alternative embodiment, side stream 170 may be routed to storage for subsequent use in a polymerization reaction or employed in any other suitable process.

In an embodiment, the first overhead stream may be separated into a second overhead stream and a second bottom stream (e.g. at block 60). In an embodiment, separating the first overhead stream 150 into a second overhead stream 190 and a second bottom stream 200 may generally comprise separating the first overhead stream 150 into a second overhead stream 190 comprising butane and lighter hydrocarbons and any other gases (e.g., hydrogen or nitrogen) and a second bottom stream 200 comprising isobutane.

In an embodiment, the first overhead stream 150 may be separated by any suitable device apparatus, or process. Non-limiting examples of suitable means of separation include accumulation, settling, condensation, membrane separation, flashing, distillation, fractionation, or the like. Not intending to be bound by theory, accumulation refers to a separation process in which components of a mixture are separated on the basis of weight and/or density. For example, the mixture may be introduced into a vessel (an accumulating vessel or accumulator) in which the lighter (less dense) components are allowed to rise toward the top of the vessel while the heavier (more dense) are allowed to fall toward the bottom of the vessel. In an embodiment, the first overhead stream 150 may comprise gaseous or vaporous components, liquid components (e.g., such components having cooled and/or condensed, for example, via flow through a condenser) or combinations thereof. In such an embodiment, the liquid components may be separated from the gaseous components in an accumulator.

In the embodiment of FIG. 1, separating the first overhead stream 150 into a second overhead stream 190 and a second bottom stream 200 may comprise routing the first overhead stream 150 into the accumulator 180. As illustrated in the embodiment of FIG. 1, the first overhead stream may be routed to the accumulator 180 via a condenser, for example to remove heat from the stream and/or allow at least a portion of the stream to condense into a liquid phase. In an embodiment, the accumulator 180 may generally comprise any suitable vessel as will allow for the separation of the components of the first overhead stream (e.g., as disclosed above). The accumulator may comprise one or more compartments or chambers, valves, at least one inlet, and two or more outlets. In an embodiment the accumulator 180 may permit the lighter components of first overhead stream 150 to rise to the top of accumulator 180 and the heavier components to fall to the bottom of the accumulator 180. For example, in an embodiment where the first overhead stream comprises both liquid and gaseous phases, the vapor phase components may rise toward the top and the liquid phase components may fall to the bottom of the accumulator 180. In an embodiment, the lighter components (e.g., the vapor phase components) may be emitted from the accumulator as the second overhead stream 190 and the heavier components (e.g., the liquid phase components) may be emitted as the second bottom stream 200. The accumulator 180 may be operated at a suitable temperature and pressure, for example, as may be suitable to cause condensation of at least one component of the second overhead stream 190. For example, the accumulator 180 may be operated at a temperature in a range of from about 30° C. to about 100° C., alternatively, from about 15° C. to about 60° C., alternatively, from about 20° C. to about 50° C., and a pressure in a range of from about 14.7 psia to about 527.9 psia, alternatively, from about 15.7 psia to about 348 psia, alternatively, from about 85 psia to about 290 psia. In an embodiment, the accumulator 180 may be configured to allow at least a portion of the isobutane present in the second overhead stream to condense while allowing at least a portion of the components other than isobutane to remain in the gas or vapor phase. For example, in an embodiment the accumulator 180 may be operated at about a vapor-liquid equilibrium in which components lighter than isobutane are substantially in a vapor phase and in which isobutane and heavier components are substantially in a liquid phase.

In an embodiment, the accumulator may be configured and/or operated such that each of the second overhead stream 190 and the second bottom stream 200 may comprise a desired portion, part, or subset of components of the first overhead stream 150. For example, as will be appreciated by one of skill in the art with the aid of this disclosure, the operating parameters of the accumulator 180, the composition of the first overhead stream 150, or combinations thereof may be manipulated such that a given stream may comprise a particular one or more components of the first overhead stream 150.

In an embodiment, second overhead stream 190 may be characterized as comprising butane, lighter hydrocarbons, and non-condensable gases (e.g., butane, isobutane, propane, ethane, methane, oxygen, helium hydrogen, nitrogen, or carbon dioxide). For example, butane and lighter hydrocarbons may be present in the second overhead stream 190 in an amount from about 90% to about 100 by total weight of the second overhead stream 190, alternatively, from about 95% to about 99.9999%, alternatively, from about 98% to about 99%. Also, for example, species heavier than butane may be present in the second overhead stream 190 in an amount less than about 1%, alternatively, less than about 0.01%, alternatively, less than about 0.0001%. The flow rate of stream 190 and stream 195 may be such that sufficient propane, lighter hydrocarbons, and non-condensable gases (e.g., propane, ethane, methane, oxygen, helium hydrogen, nitrogen, or carbon dioxide) are removed overhead in stream 210 to prevent build up in the system.

In an embodiment the second bottom stream 200 may be characterized as comprising isobutane. For example, isobutane may be present in the second bottom stream 200 in an amount from about 70% to about 100% by total weight of the second bottom stream, alternatively, from about 75% to about 99%, alternatively, from about 80% to about 98%. Also, for example, ethylene may be present in the second bottom stream 200 in an amount from about 0% to about 20% by total weight of the second bottom stream, alternatively, from about 3% to about 15%, alternatively, from about 5% to about 10%.

In an embodiment, for example, as illustrated in FIG. 1, at least a portion of the first overhead stream 150 may additionally be separated into a reflux stream 195. In the embodiment of FIG. 1, the reflux stream may be taken from the accumulator 180 and routed back to the first column 145. Furthermore, at least a portion of the reflux stream 195 may be routed/rerouted to the second column 205 (as will be discussed herein below), for example, via a suitable pump or compressor.

In an embodiment, second bottom stream 200 may be recycled (e.g. at block 62). In the embodiment of FIG. 1, recycling the second bottom stream may comprise routing, for example, via a suitable pump or compressor, the second bottom stream 200 back to and/or introducing the bottom stream into the PEP system, for example, for reuse in a polymerization reaction. In an embodiment, hexene may be introduced into the second bottom stream 200, for example, prior to routing via a pump or compressor. In an embodiment, recycling the second bottom stream may comprise routing may comprise routing the second bottom stream to an isobutane recycle unit, for example, to be prepared for re-introduction into the PEP system (e.g., by removing unwanted compounds from the bottom stream 200 and purifying the bottom stream 200). Recycling the second bottom stream 200 (comprising isobutane) may provide an efficient and/or cost-effective means of supplying isobutane for operation of the polymerization reaction process. In an alternative embodiment, second bottom stream 200 may be routed to storage for subsequent use in a polymerization reaction or employed in any other suitable process.

In an embodiment, second overhead stream 190 may be separated into a third overhead stream and a third bottom stream (e.g. at block 64). In an embodiment, separating the second overhead stream 190 may generally comprise segregating parts of the second overhead stream 190 on the basis of various differences in physical or chemical properties between those parts. In an embodiment, separating the second overhead stream 190 into a third overhead stream 210 and a third bottom stream 220 may generally comprise separating the second overhead stream 190 into a third overhead 210 stream comprising ethylene and a third bottom stream 220 comprising isobutane substantially free of olefins.

In an embodiment, separating the second overhead stream 190 into a third overhead stream and a third bottom stream may be by any suitable device, apparatus, or process. Nonlimiting examples of such a suitable process include fractionation and distillation, and the like, as described herein.

In the embodiment of FIG. 1, separating the second overhead stream 190 into a third overhead stream 210 and a third bottom stream 220 may comprise routing the stream 190 to the second column 205, which may be referred to as a lights column. In an embodiment, for example, as illustrated in FIG. 1, the second column may additionally be provided with an isobutane (e.g., fresh or uncut isobutane) stream 230 and at least a portion of the reflux stream 195. The second column 205 may be similar in form and/or function to first column 145, or may be different, as appropriate for a product or process need or desire. For example, in an embodiment the second column 205 may comprise a fractionation tower (or fractionation column). In an alternative embodiment, the second column may comprise a distillation column (or distillation tower).

The second column 205 may be configured and/or sized provide for separation of a suitable volume of gases (e.g., the second overhead stream). For example, the second column 205 may be operated at a temperature in a range of from about 50° C. to about 20° C., alternatively, from about 40° C. to about 10° C., alternatively, from about 30 to about 5° C., and a pressure in a range of from about 14.7 psia to about 529.7 psia, alternatively, from about 15.7 psia to about 348 psia, alternatively, from about 85 psia to about 290 psia. The second column 205 may be configured and/or sized provide for separation of a suitable volume of stream 190. As will be appreciated by one of skill in the art viewing this disclosure, the second overhead stream 190 may remain and/or reside within second column 205 for any suitable amount of time as may be necessary to provide sufficient separation of the components of second overhead stream 190. In an embodiment, second column 205, may be provided with at least two outlets.

In an embodiment, the second column 205 may be configured and/or operated such that each of the third overhead stream 210 and the third bottom stream 220 may comprise a desired portion, part, or subset of components of the second overhead stream 190. For example, as will be appreciated by one of skill in the art with the aid of this disclosure, the location of a particular stream outlet, the operating parameters of the second column 205, the composition of the second overhead stream 190, or combinations thereof may be manipulated such that a given stream may comprise a particular one or more components of the second overhead stream 190.

In an embodiment, third overhead stream 210 may be characterized as comprising ethane and lighter gases (e.g., ethylene, ethane, methane, carbon dioxide, nitrogen, or hydrogen). For example, ethylene may be present in the third overhead stream 210 in an amount from about 50% to about 99% by total weight of the third overhead stream, alternatively from about 60% to about 98%, alternatively, from about 70% to about 95%. In an embodiment, the third overhead stream 210 may be routed to further processing (e.g. catalytic cracking), routed to an ethylene plant, routed to storage, recycled (e.g., returned into the PEP process 100), disposed of (e.g., flared), or employed in any otherwise suitable application or process.

In an embodiment, third bottom stream 220 may comprise $C_4$. In an embodiment, the third bottom stream 220 may be free of olefins, alternatively, substantially free of olefins. For example, olefins may be present in the third bottom stream 220 in an amount less than about 1.0% by total weight of the third bottom stream, alternatively, less than about 0.5%, alternatively, less than about 0.1%.

In an embodiment, third bottom stream 220 may be recycled (e.g. at block 68). In the embodiment of FIG. 1, recycling the third bottom stream may comprise routing, for example, via a suitable pump or compressor, the third bottom stream 220 back to and/or introducing the third bottom stream 220 into the PEP system 100, for example, for reuse in a polymerization reaction. For example, in an embodiment, the third bottom stream may be combined with various other components (catalysts, cocatalysts, etc.) to form a catalyst slurry that may be introduced into the reactor 104. Not intending to be bound by theory, because the third bottom stream may comprise an olefin-free isobutane stream (alternatively, a substantially olefin-free, as disclosed above), the third bottom stream may be mixed with catalytic components (e.g., catalysts, cocatalysts, etc.) without the risk of unintended polymerization reactions (e.g., polymerization prior to introduction into the reactor). As such, the third bottom stream may serve as a source of olefin-free isobutane for a polymerization reaction. Recycling the third bottom stream 220 (comprising olefin-free isobutane) may provide an efficient and/or cost-effective means of supplying isobutane for operation of the polymerization reaction process. In an alternative embodiment, third bottom stream 220 may be routed to storage for subsequent use in a polymerization reaction or employed in any other suitable process.

In an embodiment, at least a portion of the third bottom stream 220 may be returned to the second column 205. For example, in the example of FIG. 1, a portion of the third bottom 220 stream is routed, via a reboiler, to the second column 205 for additional processing.

In one or more embodiments, the PEP systems and/or PEP processes disclosed herein may have various advantages over prior art systems and/or processes. For example, the absence of a compressive step between the flash chamber 130 and the first column 145 may improve effluent stream processing systems and methods by reducing costs associated with equipment and processing, decreasing process complexity, or combinations thereof.

In an embodiment, recycling the side stream 170 (e.g., hexene) back into the PEP process 100 may offset costs associated with hexene procurement, allow for optimized control of the hexene concentration at various points in the PEP system (e.g., in the polymerization reaction), minimize the need to use fresh hexene, which may reduce one or more of raw material purchasing, transportation, and storage costs, avoid costs associated with hexene losses (e.g., regulatory fees), yield fewer waste products, or combinations thereof. In addition, recycling hexene (e.g., as the side stream 170), which may serve as a co-monomer in the polymerization process, may allow the quality and/or quantity of hexene routed to other points in the PEP system (e.g., a polymerization reactor) to be independently controlled. Such independent control of hexene may lead to improved process control, the ability to optimize the process, and/or improved process efficiency, thereby reducing process costs and helping to minimize system complexity and/or downtime.

In an embodiment, the PEP systems and/or PEP processes disclosed herein may also allow for the separation of isobutane from heavy hydrocarbons present in the effluent stream (e.g., butane, pentane, hexane, hexene, heptane, etc). Isolating isobutane from such heavier hydrocarbons which may allow the isobutane routed to other points in the PEP system (e.g., the lights column) to be independently controlled. Such independent control of the isobutane may lead to improved process control and/or process efficiency, thereby reducing process costs and helping to minimize system complexity and/or downtime.

In an embodiment, the PEP systems and/or PEP processes disclosed herein may necessitate less energy consumption than other effluent stream methods. For example, optimized process flows as disclosed herein may necessitate less energy for the process and/or may reduce the number of components, and thereby leading to additional energy consumption reductions.

In an embodiment, the PEP systems and/or PEP processes disclosed herein may provide a source of hexene-free isobutane, which may facilitate responding to process fouling from the inadvertent introduction of, for example, hexene into the isobutane stream. In such an embodiment, the introduction of hexene-free isobutane may be employed to reverse the effects of hexene fouling of the isobutane stream through flushing or other remediation methods. Such usage of the hexene-free isobutane stream may, in turn, provide reduced downtime and thereby improve system uptime.

In an embodiment, the arrangement and configuration of embodiments of the PEP systems and/or PEP processes disclosed herein may yield substantial and unanticipated reductions in the time required to transition such a system and/or process from the production of a first polymer product to a second, different polymer product. In an embodiment the number of steps, processes, and/or components involved in such a transition from one polymerization reaction to another, along with the related system equilibration required after the transition, may be reduced by the systems and/or methods disclosed herein. For example, the simplified process flow and/or the reduction in the number of components of the systems disclosed herein may reduce the duration of operational time required to attain process equilibrium after such process changes. Such minimization of equilibration times may lead to reduced downtime (i.e. increased up-time) via faster transitions, which in turn may provide financial benefits.

In an embodiment, overall system robustness may be another unexpected benefit of the systems and/or processes disclosed herein, and may be accompanied by the related capital and/or operating overhead reductions associated therewith. For example, such overall system robustness may be the result of a simplified process flow and/or the reduction in the number and complexity of components of such systems.

While the present disclosure has been illustrated and described in terms of particular apparatus and methods of use, it is apparent that equivalent techniques, components and constituents may be substituted for those shown, and other changes can be made within the scope of the present disclosure as defined by the appended claims.

EXAMPLES

The disclosure having been generally described, the following example is given as particular embodiment of the disclosure and to demonstrate the practice and advantages thereof. It is understood that this example is given by way of illustration and is not intended to limit the specification or the claims in any manner.

Prophetic Example 1

Figure 3:
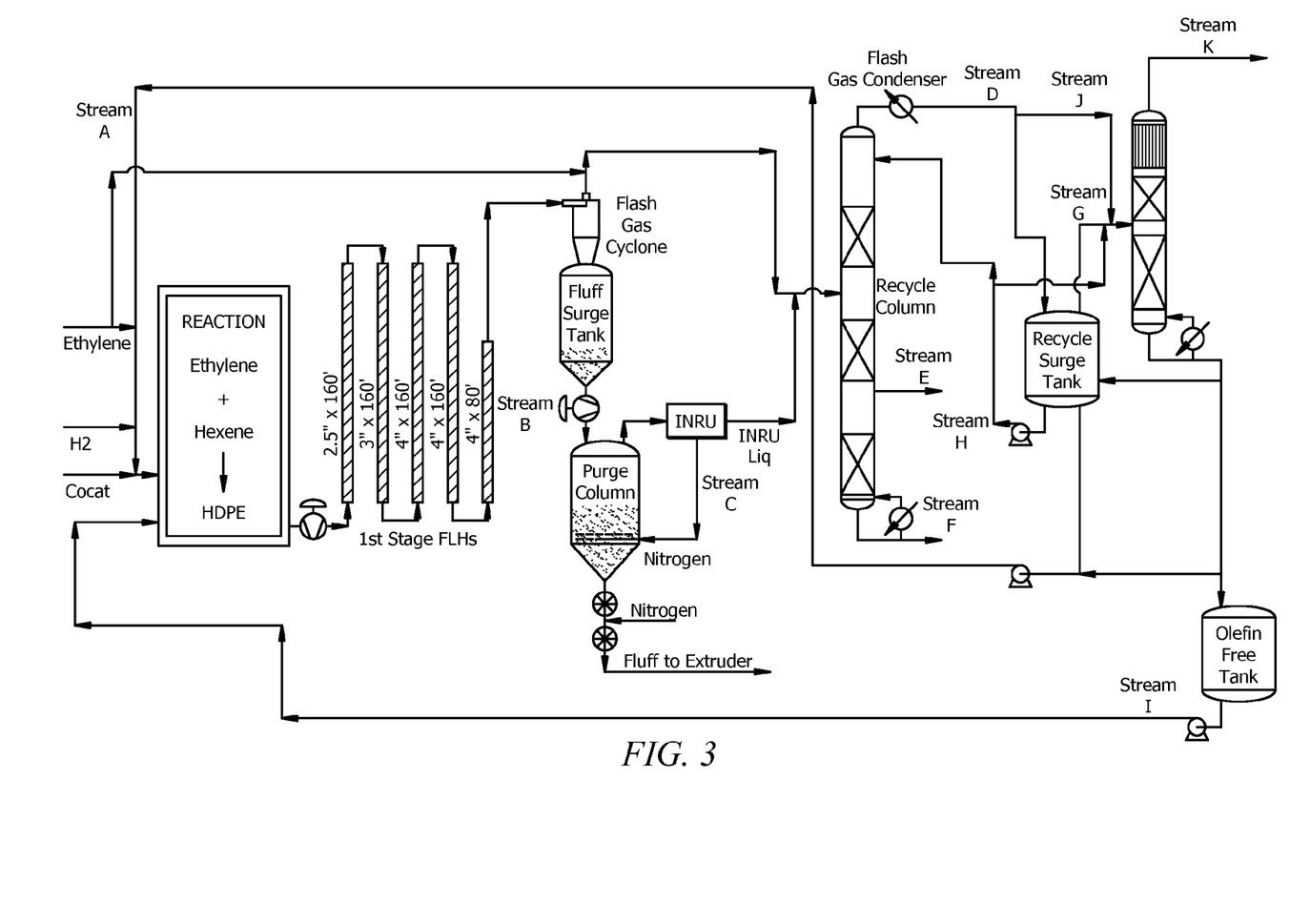
FIG. 3 is a block diagram of a polyethylene polymerization system, according to an embodiment of the disclosure.

To demonstrate the operation of the systems and/or processes disclosed herein, a computerized commercial process simulator was employed to generate an output from a model in accordance with the systems and/or processes disclosed herein. The model employed is illustrated at FIG. 3. In the model of FIG. 3, the simulation begins with the introduction of a gaseous stream (for example, like the purified feed stream disclosed herein). The output generated by the commercial process simulator is a material balance and a heat balance, shown in Table 1, below. The names designating the various streams listed in Table 1 correspond to streams illustrated in FIG. 3.

TABLE 1

| | wt % | | | | | | | | | | |
| --- | --- | --- | --- | --- | --- | --- | --- | --- | --- | --- | --- |
| | A | B | C | D | E | F | G | H | I | J | K |
| Hydrogen | 0.010% | 0.087% | 0.087% | 0.07% | — | — | 1.22% | 0.00% | 0.0% | — | 5.9% |
| Nitrogen | 0.006% | 0.006% | 0.198% | 0.02% | — | — | 0.36% | 0.00% | 0.00% | — | 1.7% |
| Ethylene | 2.092% | 3.006% | 3.001% | 2.98% | — | — | 15.64% | 2.00% | 0.00% | — | 74.9% |
| Ethane | 0.195% | 0.264% | 0.264% | 0.26% | — | — | 1.07% | 0.00% | 0.00% | — | 5.1% |
| Propane | 0.000% | 0.000% | 0.000% | 0.00% | — | — | 0.00% | 0.00% | 0.00% | 0.0% | 0.0% |
| Butene | 1.406% | 1.429% | 1.426% | 1.48% | — | — | 1.13% | 2.00% | 1.36% | — | 0.1% |
| Isobutane | 90.262% | 91.740% | 91.560% | 95.19% | 0.3% | 0.0% | 80.56% | 96.00% | 98.63% | 99.9% | 12.3% |
| n-Butane | 0.001% | 0.001% | 0.000% | 0.00% | 0.0% | 0.0% | 0.00% | 0.00% | 0.00% | 0.0% | 0.0% |
| Hexene | 5.763% | 3.200% | 3.195% | 0.00% | 92.4% | 87.9% | 0.00% | 0.00% | 0.00% | — | 0.0% |
| n-Hexane | 0.265% | 0.268% | 0.267% | 0.00% | 7.3% | 12.1% | 0.00% | 0.00% | 0.00% | — | 0.0% |

Additional Disclosure

The following are nonlimiting, specific embodiments in accordance with the present disclosure:

Embodiment A

A method of treating a polymerization reactor effluent stream comprising:
 recovering the reactor effluent stream from the polymerization reactor;
 flashing the reactor effluent stream to form a flash gas stream;
 separating the flash gas stream into a first top stream, a first bottom stream, and a side stream, wherein the side stream substantially comprises hexene;
 separating the first top stream into a second top stream and a second bottom stream, wherein the second bottom stream substantially comprises isobutane; and
 separating the second top stream into a third top stream and a third bottom stream, wherein the third top stream substantially comprises ethylene, and wherein the third bottom stream is substantially free of olefins.

Embodiment B

The method of Embodiment A, further comprising returning at least a portion of the side stream to the polymerization reactor.

Embodiment C

The method of Embodiment B, wherein the concentration of the hexene in the polymerization reactor is controlled, at least in part, by the side stream.

Embodiment D

The method of one of Embodiments A through C wherein the flash gas stream is separated by fractionation.

Embodiment E

The method of one of Embodiments A through D, wherein the first top stream is separated by accumulation.

Embodiment F

The method of one of Embodiments A through E, wherein the second top stream is separated by fractionation.

Embodiment G

The method of one of Embodiments A through F, wherein the pressure of the flash gas stream after flashing the effluent stream is substantially the same as the pressure of the flash gas stream prior to separating the flash gas stream.

Embodiment H

The method of one of Embodiments A through G, wherein at least a portion of the second bottom stream forms an isobutane recycle stream.

Embodiment I

The method of Embodiment H, wherein at least a portion of the isobutane recycle stream is fed into the polymerization reactor.

Embodiment J

The method of Embodiments H and I, wherein the isobutane recycle stream comprises greater than about 95% by weight isobutane and less than about 5% by weight olefins.

Embodiment K

A method of treating a polymerization reactor effluent stream comprising:
  recovering the effluent stream from the polymerization reactor;
  flashing the effluent stream to form a flash gas stream;
  feeding the flash gas stream into a first column;
  recovering a first overhead stream, a first bottom stream, and a side stream, from the first column, wherein the side stream substantially comprises hexene;
  feeding the first overhead stream into an accumulator vessel;
  recovering a second overhead stream and a second bottom stream from the accumulator vessel, wherein the second bottom stream substantially comprises isobutane;
  feeding the second overhead stream to a second column; and
  recovering a third overhead stream and a third bottom stream from the second column, wherein the third bottom stream is substantially olefin-free.

Embodiment L

The method of Embodiment K, further comprising, returning at least a portion of the side stream to the polymerization reactor.

Embodiment M

The method of Embodiment L, wherein the concentration of the hexene in the polymerization reactor is controlled, at least in part, by the side stream.

Embodiment N

The method of one of Embodiments K through M, wherein the pressure of the flash gas stream after flashing the effluent stream is substantially the same as the pressure of the flash gas stream at the inlet of the first column.

Embodiment O

The method of one of Embodiments K through N, wherein a portion of the second bottom stream from the accumulator vessel forms an isobutane recycle stream.

Embodiment P

The method of Embodiment O, wherein at least a portion of the isobutane recycle stream is fed into the polymerization reactor.

Embodiment Q

The method of Embodiments O and P, wherein the isobutane recycle stream comprises greater than about 95% isobutane and less than about 5% olefins.

Embodiment R

The method of Embodiment Q, wherein the olefins comprise ethylene, hexene, or combinations thereof.

Embodiment S

The method of one of Embodiments P through R, wherein the concentration of isobutane in the polymerization reactor is controlled, at least in part, by the isobutane recycle stream.

Embodiment T

The method of one of Embodiments K through S, wherein the third overhead stream comprises at least 90% by weight ethylene.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent ... 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. A system for treating a polymerization reactor effluent stream from a polymerization reactor comprising:
   the polymerization reactor effluent stream, wherein the polymerization reactor effluent stream is fed from the polymerization reactor to a flash chamber;
   a polymer product stream, wherein the polymer product stream is recovered from the flash chamber;
   a flash gas stream, wherein the flash gas stream is fed from the flash chamber to a first column;
   a first column bottom stream, wherein the first column bottom stream is recovered from the first column;
   a first column side stream, wherein the first column side stream is fed from the first column to the polymerization reactor such that the concentration of hexene in the polymerization reactor is controlled, at least in part, by the first column side stream, and wherein the first column side stream substantially comprises hexene; and
   a first column overhead stream, wherein the first column overhead stream is recovered from the first column.

2. The system of claim 1, wherein the flash gas stream is separated by fractionation.

3. The system of claim 1, wherein the pressure of the flash gas stream in the flash chamber is substantially the same as the pressure of the flash gas stream within the first column.

4. The system of claim 1, wherein the first column overhead stream is fed from the first column to an accumulator, and further comprising
   an accumulator bottom stream, wherein the accumulator bottom stream is fed from the accumulator to the polymerization reactor, and wherein the accumulator bottom stream substantially comprises isobutane;
   an accumulator overhead stream, wherein the accumulator overhead stream is fed from the accumulator to as second column; and
   a second column bottom stream, wherein the second column bottom stream is substantially free of olefins.

5. The system of claim 4, wherein the olefins comprise ethylene, hexene, or combinations thereof.

6. The system of claim 4, further comprising a second column overhead stream, wherein the second column overhead stream substantially comprises ethylene.

7. The system of claim 6, wherein the second column overhead stream comprises at least 90% by weight ethylene.

8. The system of claim 6, wherein the second column overhead stream comprises at least 95% by weight ethylene.

9. A system for treating a polymerization reactor effluent stream from a polymerization reactor comprising:
   the polymerization reactor effluent stream, wherein the polymerization reactor effluent stream is fed from the polymerization reactor to a flash chamber;
   a polymer product stream, wherein the polymer product stream is recovered from the flash chamber;
   a flash gas stream, wherein the flash gas stream is fed from the flash chamber to a first column;
   a first column side stream, wherein the first column side stream is fed from the first column to the polymerization reactor such that the concentration of hexene in the polymerization reactor is controlled, at least in part, by the first column side stream, and wherein the first column side stream substantially comprises hexene;
   a first column overhead stream, wherein the first column overhead stream is fluidicly communicated from the first column to an accumulator;
   an accumulator overhead stream, wherein the accumulator overhead stream is fed from the accumulator to a second column;
   a second column overhead stream, wherein the second column overhead stream substantially comprises ethylene; and
   a second column bottom stream, wherein the second column bottom stream is substantially free of olefins.

10. The system of claim 9, wherein the flash gas stream is separated by fractionation.

11. The system of claim 9, wherein the accumulator overhead stream is separated into the second column overhead stream and the second column bottom stream by fractionation.

12. The system of claim 9, wherein the olefins comprise ethylene, hexene, or combinations thereof.

13. The system of claim 9, wherein the second column overhead stream comprises at least 90% by weight ethylene.

14. The system of claim 9, wherein the second column overhead stream comprises at least 95% by weight ethylene.

15. The system of claim 9, wherein the second column overhead stream comprises a recycle stream.

16. A system for treating a polymerization reactor effluent stream from a polymerization reactor comprising:
   the polymerization reactor;
   the polymerization reactor effluent stream, wherein the polymerization reactor effluent stream is fed from the polymerization reactor to a flash chamber;
   the flash chamber;
   a polymer product stream, wherein the polymer product stream is recovered from the flash chamber;
   a flash gas stream, wherein the flash gas stream is fed from the flash chamber to a first column;
   the first column;

a first column bottom stream, wherein the first column bottom stream is recovered from the first column;

a first column side stream, wherein the first column side stream is fed from the first column to the polymerization reactor such that the concentration of hexene in the polymerization reactor is controlled, at least in part, by the first column side stream, and wherein the first column side stream substantially comprises hexene; and a first column overhead stream, wherein the first column overhead stream is recovered from the first column.

17. The system of claim 16, wherein the first column is configured to separate the flash gas stream by fractionation.

18. The system of claim 16, wherein the pressure of the flash gas stream in the flash chamber is substantially the same as the pressure of the flash gas stream within the first column.

19. The system of claim 1, wherein the first column side stream comprises from about 50% by weight hexene to about 98% by weight hexene.

20. The system of claim 9, wherein the first column side stream comprises from about 50% by weight hexene to about 98% by weight hexene.

\* \* \* \* \*